(12) United States Patent
Goh

(10) Patent No.: US 6,784,937 B1
(45) Date of Patent: Aug. 31, 2004

(54) LENS ASSEMBLY OF DIGITAL CAMERA WITH NON-STEP FOCUSING FUNCTION

(75) Inventor: Nai-Sim Goh, Taipei (TW)

(73) Assignee: Nu-Cam Corporation, Taipei (TW)

( * ) Notice: Subject to any disclaimer, the term of this patent is extended or adjusted under 35 U.S.C. 154(b) by 0 days.

(21) Appl. No.: 09/358,826

(22) Filed: Jul. 22, 1999

(30) Foreign Application Priority Data

Sep. 4, 1998 (TW) .................................... 87214572 U

(51) Int. Cl.[7] .......................... G02B 13/16; H04N 5/225
(52) U.S. Cl. ..................... 348/335; 359/705; 359/706; 359/825; 396/82; 396/133
(58) Field of Search ................................ 348/357, 374, 348/335; 396/139, 142, 533, 144, 89, 133, 72, 73, 74, 75, 79, 349; 359/699, 700, 701, 705, 706, 825, 694, 696, 702, 703, 819, 820

(56) References Cited

U.S. PATENT DOCUMENTS

| | | | | |
|---|---|---|---|---|
| 3,696,725 A | * | 10/1972 | Lange .......................... | 359/823 |
| 3,951,522 A | * | 4/1976 | Hashimoto .................. | 359/694 |
| 4,030,113 A | * | 6/1977 | Obreschkow ................ | 396/533 |
| 4,404,595 A | * | 9/1983 | Ushiro et al. ............... | 348/357 |
| 4,411,498 A | * | 10/1983 | Muryoi ........................ | 359/704 |
| 4,585,313 A | * | 4/1986 | Iwata et al. .................. | 359/696 |
| 4,748,466 A | * | 5/1988 | Yamada et al. ............... | 396/73 |
| 4,825,240 A | * | 4/1989 | Sawamura ................... | 396/133 |
| 4,834,514 A | * | 5/1989 | Atsuta et al. ................ | 359/699 |
| 5,032,919 A | * | 7/1991 | Randmae ..................... | 348/345 |
| 5,225,939 A | * | 7/1993 | Iizuka ......................... | 359/811 |
| 5,400,073 A | * | 3/1995 | Morioka et al. ............. | 348/335 |
| 5,461,443 A | * | 10/1995 | Nakayama et al. ........... | 396/89 |
| 5,731,913 A | * | 3/1998 | Imanari ....................... | 359/700 |
| 5,739,853 A | * | 4/1998 | Takahashi .................... | 348/335 |
| 5,748,386 A | * | 5/1998 | Nakayama et al. .......... | 359/694 |
| 5,790,319 A | * | 8/1998 | Okada et al. ................ | 359/694 |
| 5,805,353 A | * | 9/1998 | Ichino et al. ................ | 359/699 |
| 5,825,559 A | * | 10/1998 | Johnson et al. ............. | 359/819 |
| 5,861,998 A | * | 1/1999 | Nishimura ................... | 359/694 |
| 5,889,555 A | * | 3/1999 | Kawase et al. ............. | 348/336 |
| 5,969,889 A | * | 10/1999 | Iikawa et al. ............... | 359/825 |
| 5,983,033 A | * | 11/1999 | Yamazaki et al. ............ | 396/85 |
| 6,031,997 A | * | 2/2000 | Ohmiya ....................... | 396/72 |
| 6,075,655 A | * | 6/2000 | Funahashi et al. .......... | 359/696 |
| 6,266,486 B1 | * | 7/2001 | Kohno ......................... | 396/72 |
| 6,366,323 B1 | * | 4/2002 | Shono ......................... | 348/340 |
| 6,421,088 B1 | * | 7/2002 | Lee ............................. | 348/347 |
| 6,590,720 B2 | * | 7/2003 | Oba ............................ | 359/819 |

FOREIGN PATENT DOCUMENTS

JP 03150734 A * 6/1991 ........... G11B/7/095

\* cited by examiner

*Primary Examiner*—Andrew Christensen
*Assistant Examiner*—Brian C Genco
(74) *Attorney, Agent, or Firm*—Hoffman, Wasson & Gitler, P.C.

(57) ABSTRACT

The present invention discloses a lens assembly comprising an enclosure, annular rotating means, gear assembly, spring, leaf spring, cap, and lens. The enclosure has a housing and haft. The housing has a lower hole for supporting the image capture apparatus, and an upper hole, which is consisted of three slope sets. Each slope set has a sub-slope and a main slope, the main slopes of the slope sets having a same gradient and being in a same height at highest points or lowest points of the main slopes. The annular rotating means having three extrusive portions is connected to the slope sets of enclosure. The gear assembly, which is supported by the haft of enclosure and connected with the annular rotating means, is applied for driving the annular rotating means. The spring is mounted on the first inner rim of the upper surface of the annular rotating means. The leaf spring is placed on the second inner rim of the upper surface of the annular rotating means. The cap having a hollow part is connected with the enclosure, and the lens connected with the cap allows the light to project on the image capture apparatus.

15 Claims, 12 Drawing Sheets

LENS ASSEMBLY OF DIGITAL CAMERA WITH NON-STEP FOCUSING FUNCTION

FIELD OF THE INVENTION

The present invention relates to a digital camera, especially to a lens assembly of the digital camera, which has a non-step focusing function.

BACKGROUND OF THE INVENTION

In the progress of semiconductor technology, many electronic devices of analogous circuit are replaced by the digital ones. Digital camera is one of the widely spread electronic devices. FIG. 1A and FIG. 1B illustrate the front view and back view of a conventional digital camera. As shown in FIG. 1A and FIG. 1B, conventional digital camera 100 includes a unique-focus lens assembly 102, a display monitor 110 on the back of the digital camera 100, and viewfinder 114 for selecting the object to be captured.

FIG. 2 shows a functional diagram of the conventional digital camera. As illustrated in FIG. 2, the digital camera 100 includes a unique-focus lens assembly 102, image capture apparatus (i.e. CCD, CMOS Sensor) 104, A/D converter 106, processing module 108, display monitor 110, and storage module 112. The unique-focus lens assembly 102 is utilized for allowing the reflected light of objects to pass through. The reflected light is then transformed into electric signals by the image capture apparatus 104. Thereafter, the electric signals are further transformed into digital signals by the A/D converter 106. The digital signals are then calculated and managed by the processing module 108. The display monitor 110 coupled with the processing module 108 is for displaying the image, which is taken by the image capture apparatus 104. The storage module 112 is applied for saving the digital signals from the processing module 108.

FIG. 3 portraits a unique-focus lens assembly of the conventional digital camera. As shown in FIG. 3, the unique-focus lens assembly 102 includes a lens 202, enclosure 204, aluminum plate 206, image capture apparatus (i.e. CCD, CMOS Sensor) 208, insulation plate 210, and focus adjustment means 212. The lens 202 allows the reflected light of any objects to pass through. The enclosure 204 has a first hole in its upper end and a second hole in its lower end. The first hole supports the lens 202, and the second hole is used for receiving the image capture apparatus 208. The focus adjustment means 212 is mounted near the side wall of enclosure 204. By revolving the focus adjustment means 212, the screw 212A would be driven upward or downward along the direction, which is perpendicular to the lens 202, thereby adjusting the focus of the lens 202. After the calibration of screw 212A achieved, the screw 212A is welded in the lens assembly 102, thereby fixing the focus of lens 202. The image capture apparatus 208 coupled with the second hole of enclosure 208 transforms the light reflected from the lens 202 into electric signals. Aluminum plate 206 is connected with the image capture apparatus 208 and enclosure 204. Insulation plate 210, which is coupled with the aluminum plate 206, is used for isolating the aluminum plate 206 from electrically connecting with the circuit of insulation plate 210.

The location of lens 202 is adjusted by rotating the screw 212A of the focus adjustment means 212. The lens 202 would be driven upward or downward along the perpendicular orientation to itself, so as to locate the focus of the lens 202. During the procedure of focus calibration, since there is a force perpendicular to the axial direction of screw 212A, it would probably horizontally offset the position of lens 202. Typically, for avoiding the offset, the lens assembly needs to be fixed rigidly. Furthermore, when the adjustment of the screw 212A finished, the screw 212A could be fixed by welding. Therefore, the lens assembly 102 of conventional digital camera could only have a unique-focus, and it would be unavailable to take the scenes out of the focus range or take them ambiguously.

Since that, how to improve the above problems of the conventional digital might be an important issue to the people skilled in the art.

SUMMARY OF THE INVENTION

An object of the invention is to provide a digital camera with a non-step focusing function so as to take scenes in different distances into pictures.

The present invention discloses a digital camera with a non-step focusing function, which comprises a non-step focusing lens assembly, image capture sensor (i.e. CCD, CMOS Sensor), A/D converter, processing module, display monitor, and storage module. The light reflected from any objects is passed through the non-step focusing lens, and transformed into electric signals by the image capture means. The electric signals are then transformed into digital signals. It is noticeable that the above functions, such as focusing and information transforming, are controlled and managed by the processing module.

The lens assembly comprises an enclosure, annular rotating means, gear assembly, spring, leaf spring, cap, and lens. The enclosure has a housing and haft. The housing has a lower hole for supporting the image capture apparatus, and an upper hole, which is consisted of three slope sets. Each slope set has a sub-slope and a main slope, the main slopes of the slope sets having a same gradient and being in a same height at highest points or lowest points of the main slopes. The annular rotating means having three extrusive portions is connected to the slope sets of enclosure. The gear assembly, which is supported by the haft of enclosure and connected with the annular rotating means, is applied for driving the annular rotating means. The spring is mounted on the first inner rim of the upper surface of the annular rotating means. The leaf spring is placed on the second inner rim of the upper surface of the annular rotating means. The cap having a hollow part is connected with the enclosure, and the lens connected with the cap allows the light to project on the image capture apparatus.

The annular rotating means could revolve on any slope sets to make sure that the lens assembly would move in the direction perpendicular to the slope sets, thereby adjusting the focus of lens assembly. As for the location of the focus, it is determined by the height of the main slopes.

DETAILED DESCRIPTION OF THE PREFERRED EMBODIMENTS

Figure 1A:
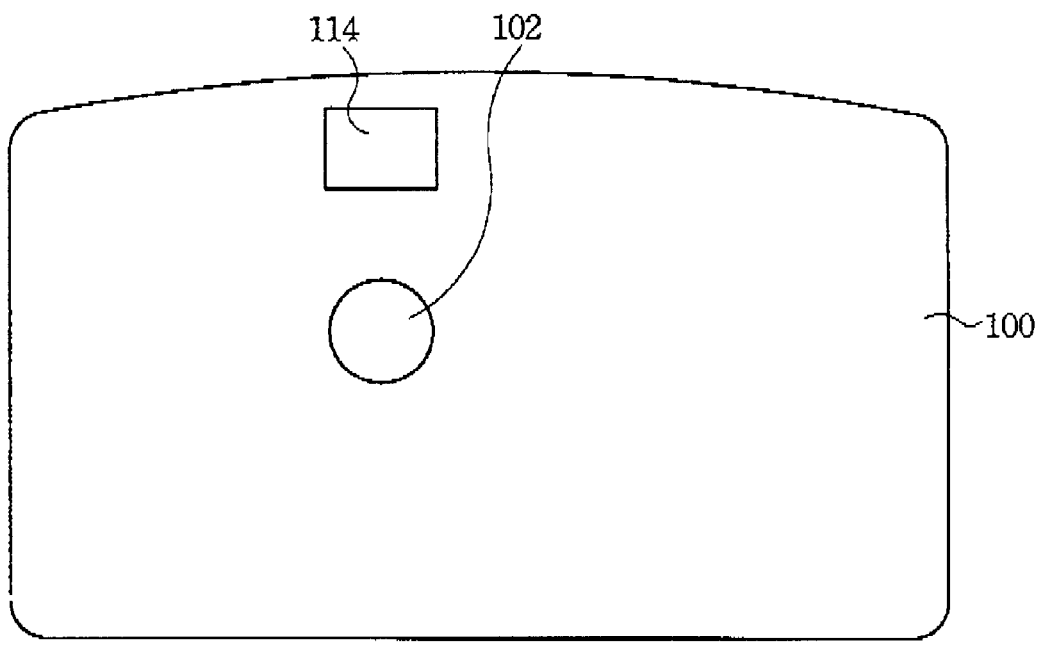
FIG. 1A displays a front view of the conventional digital camera.
Figure 1B:
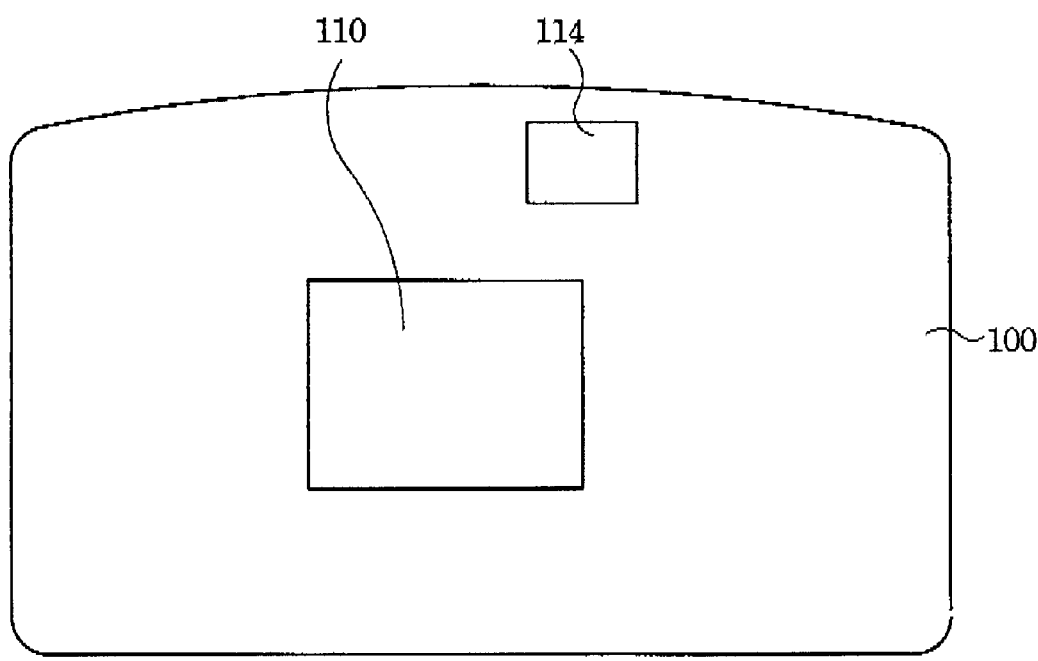
FIG 1B displays a back view of the conventional digital camera.
Figure 2:
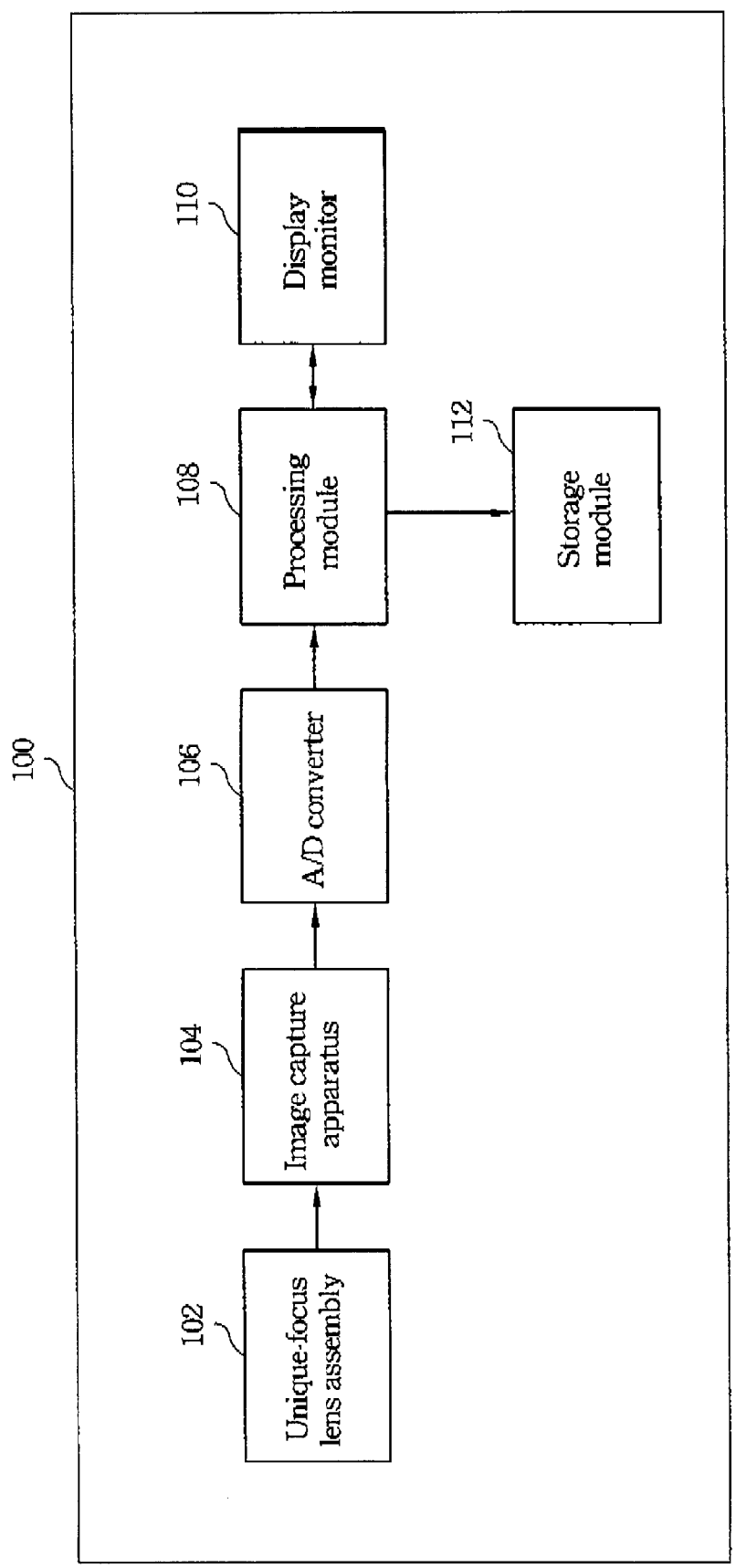
FIG. 2 displays a functional diagram of the conventional digital camera.
Figure 3:
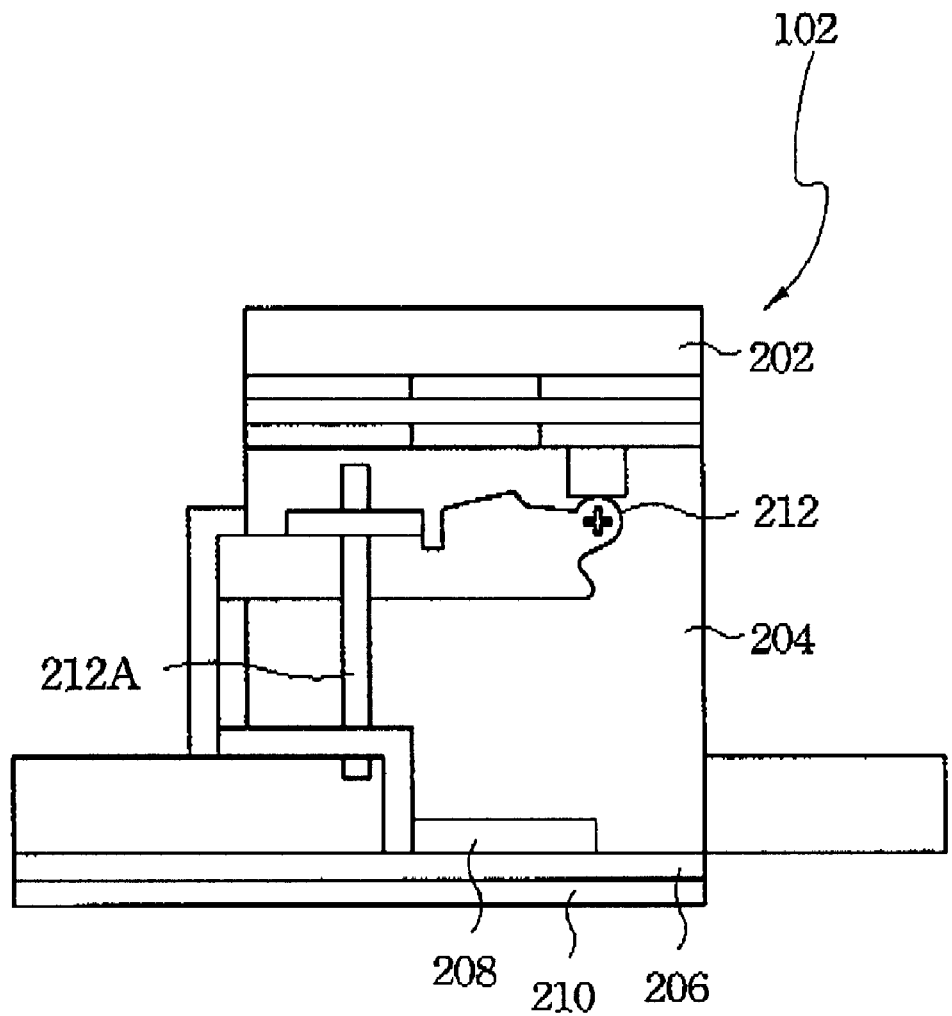
FIG. 3 displays a unique-focus adjustment means of the conventional digital camera.
Figure 4A:
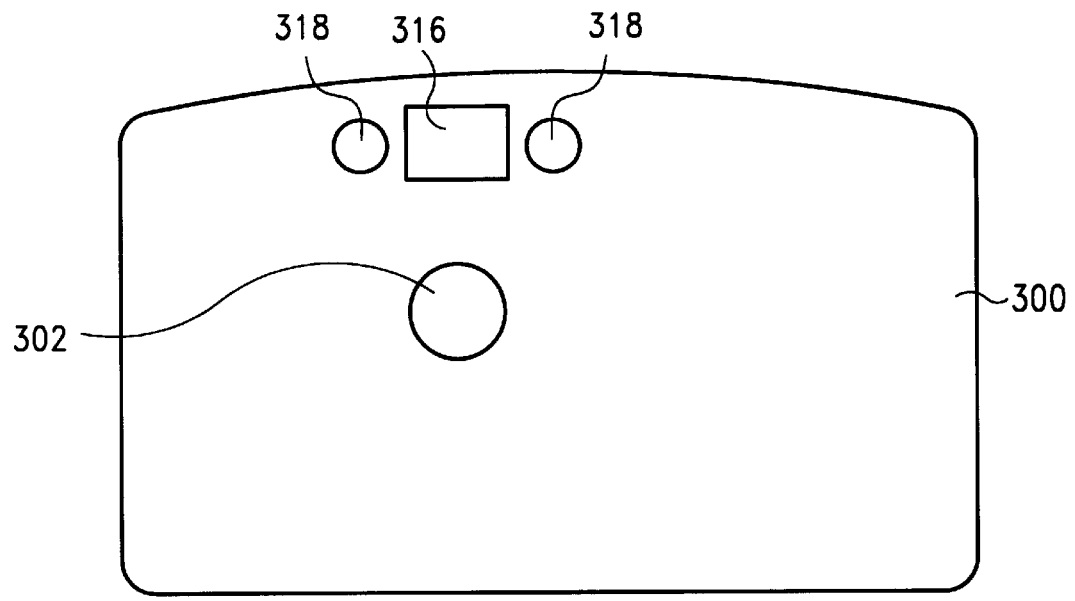
FIG. 4A displays a front view of an embodiment of the present non-step digital camera.
Figure 4B:
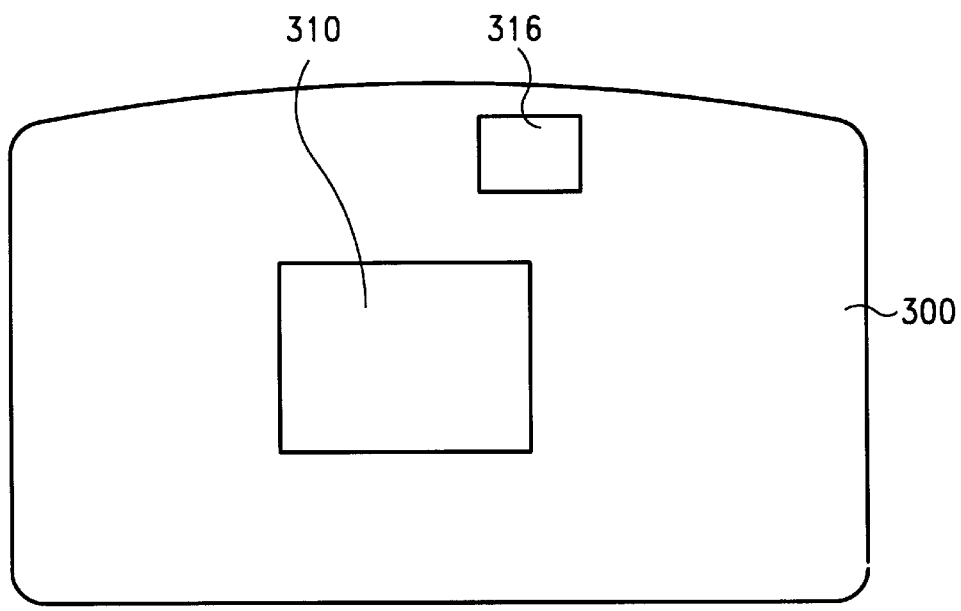
FIG. 4B displays a back view of an embodiment of the present non-step digital camera.

The present invention discloses a lens assembly whit a non-step focusing function, for providing a flexibility to take the scenes in different image depths. As shown in FIG. 4A and FIG. 4B, the present digital camera 300 includes a non-step focusing lens assembly 302 for capable to adjust its focus. Two position sensitive detectors(PSD)318 and a viewfinder 316 are also shown in the front view of the digital camera 300. When using the viewfinder 316 to catch the image of scenes and taking pictures, the position sensitive detectors 318, which are located beside the viewfinder 316, would measure the distance from the digital camera 300 to the object by applying infrared light in accordance with a triangle measurement system.

Figure 5:
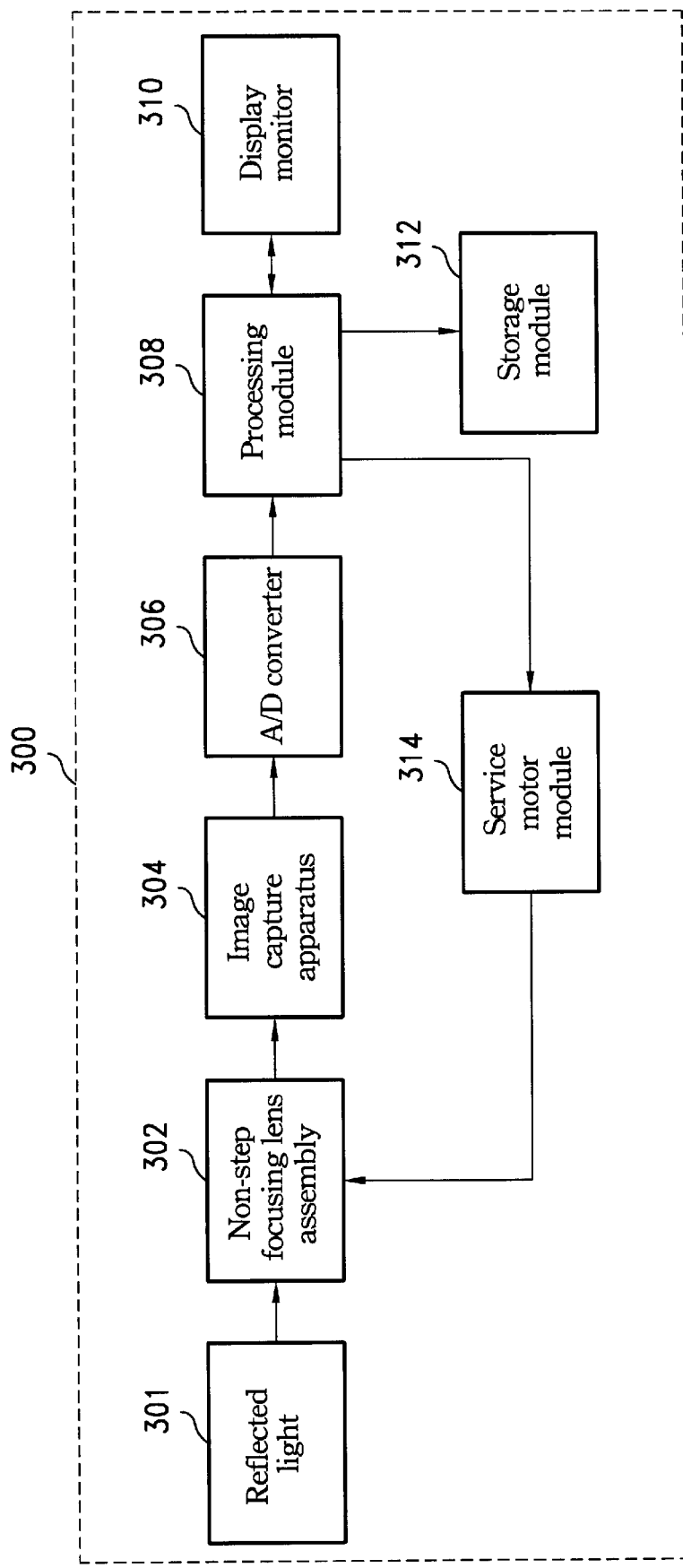
FIG. 5 displays a functional diagram of an embodiment of the present non-step digital camera.

Referring to FIG. 5, the functional diagram of the digital camera with a non-step focusing lens assembly is shown. The reflected light 301 of any objects is projected via the non-step focusing lens assembly 302, and captured by the image capture apparatus 304, such as CCD and CMOS Sensor, and then outputted as electric signals. The electric signals are transformed into digital signals by the A/D converter 306. Thereafter, the digital signals are calculated and managed by the processing module 308.

The present non-step focusing digital camera 300 could be automatically focused by the infrared light from position sensitive detectors 318 in accordance with the triangle measurement, which applies the angle between the emitted infrared light and reflected infrared light to determine the length of focus. A traditional active measurement, yet another way to determine the focus of non-step focusing digital camera 300, is to calculate the time of flight of an echo, which is emitted by the digital camera 300 and reflected by desired objects. Therefore, the processing module 308 calculates and manages the information about focus and then drives the service motor module 314 (i.e. service motor and control circuit) to determine the output angles of service motor so as to make the captured image as clear as possible. The automatically focusing function of the digital camera 300 could be also a passive type, in which the service motor module 314 keeps on rotating to adjust the focus, until the captured image is the clearest one. The criterion of the passive type of automatically focusing function is to compare whether the image captured by CCD is on focus or not. It is noticeable that the active type of automatically focusing function will not be influenced by the illumination of the environment. It means that the active type of automatically focusing function can be used even in a dark environment. However the passive type could be only used in a specific illuminated surroundings. In addition, the present invention could also divide the rotation of service motor into several steps so as to be an alternative of the present digital camera with a multi-step focusing function.

Figure 6A:
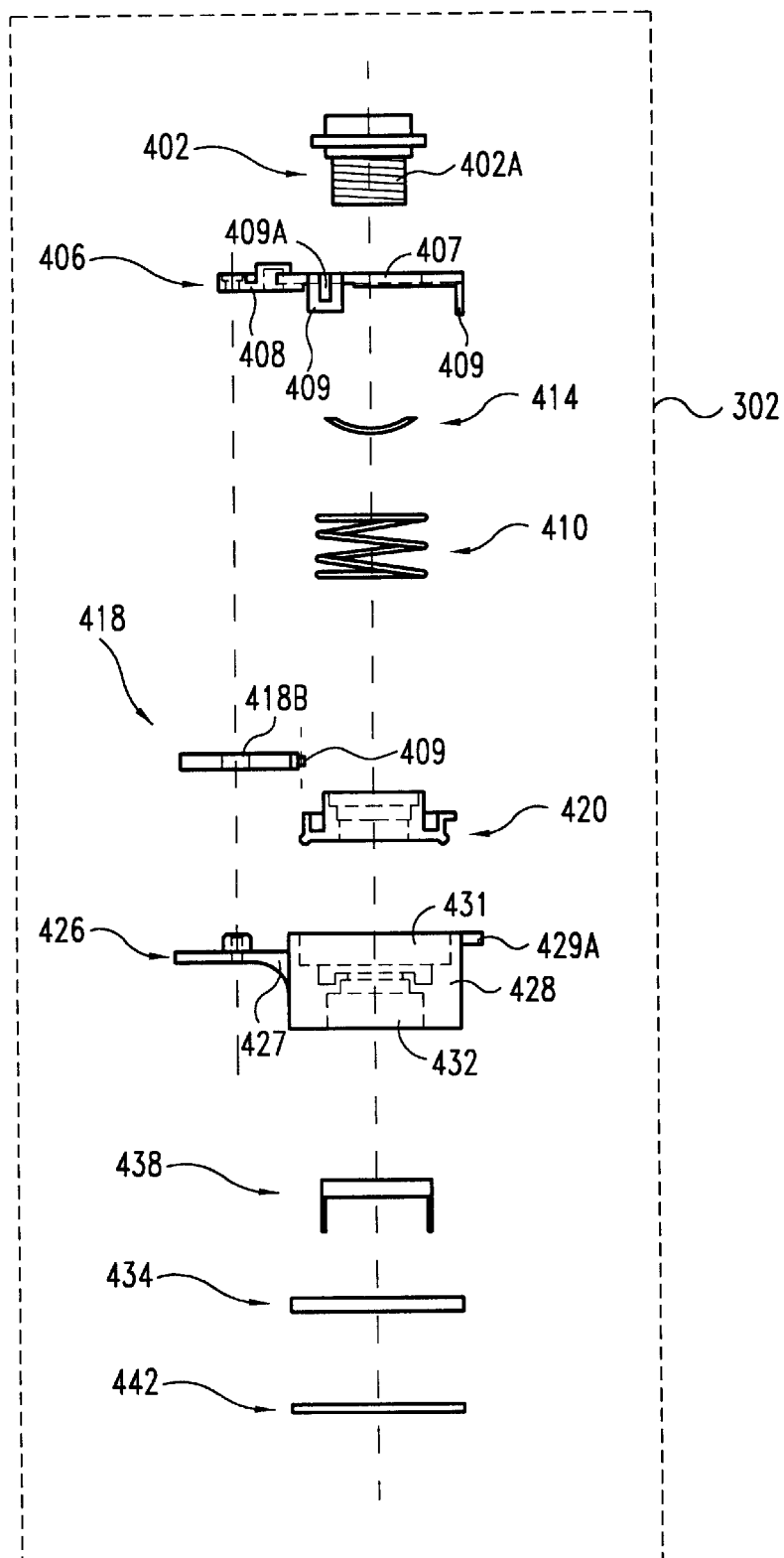
FIG. 6A displays accessories of the lens assembly in an embodiment of the present non-step digital camera.
Figure 6B:
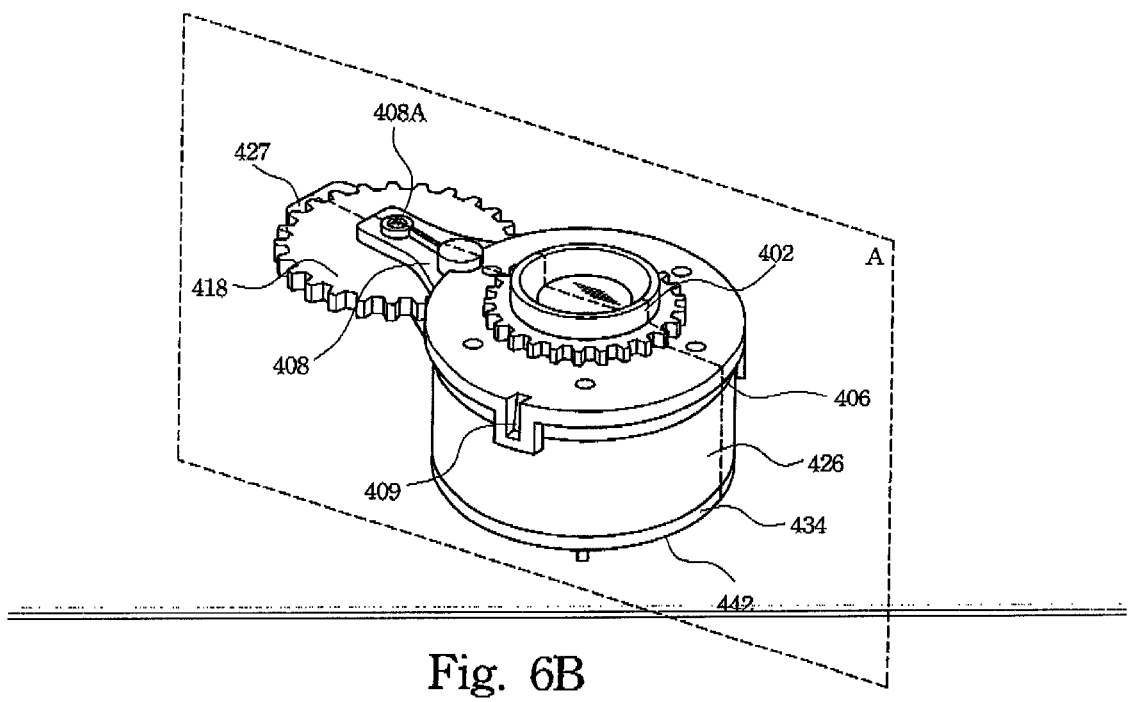
FIG. 6B displays the lens assembly in an embodiment of the present non-step digital camera.
Figure 6C:
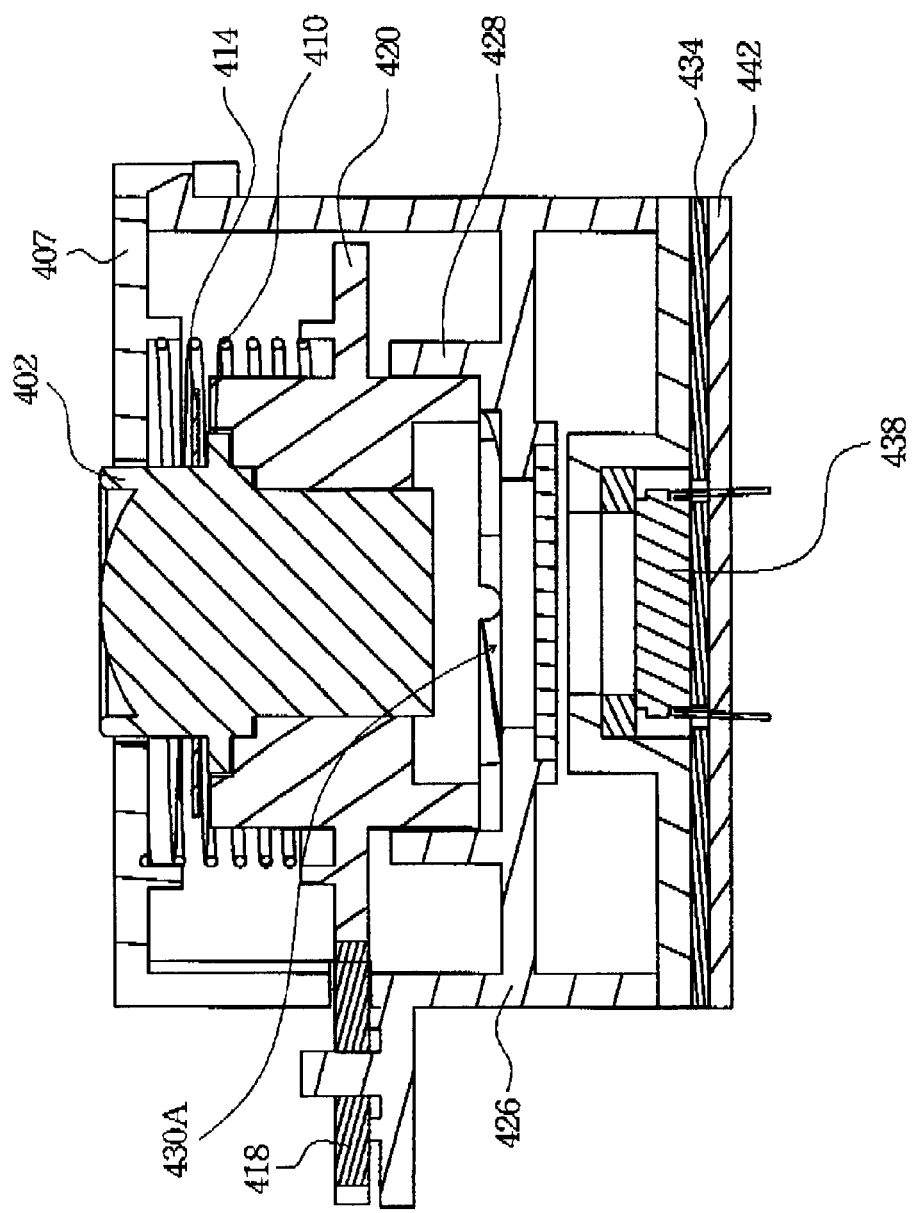
FIG. 6C is a diagram of a cross-section plane A in FIG. 6B.

FIG. 6A shows accessories of lens assembly of digital camera. The non-step focusing lens assembly 302 includes a lens 402, cap 406, leaf spring 414, spring 410, gear assembly 418, annular rotating means 420, enclosure 426, image capture apparatus 438, aluminum plate 434, and insulation plate 442. FIG. 6B is a view of construction of the accessories in FIG. 6A. The leaf spring 414 is mounted on the inner threads of the forth rim 422C of annular rotating means 420. Spring 410 is mounted on the second rim 422A of annular rotating means 420, thereby keeping the annular rotating means 420 still connected tightly with the lens assembly, while it moving on main slopes. FIG. 6C is a diagram of a cross-section plane A of the FIG. 6B. For describing the invention clearly, the following paragraphs illustrate the details and connection relations of the accessories in FIG. 6A.

Figure 7:
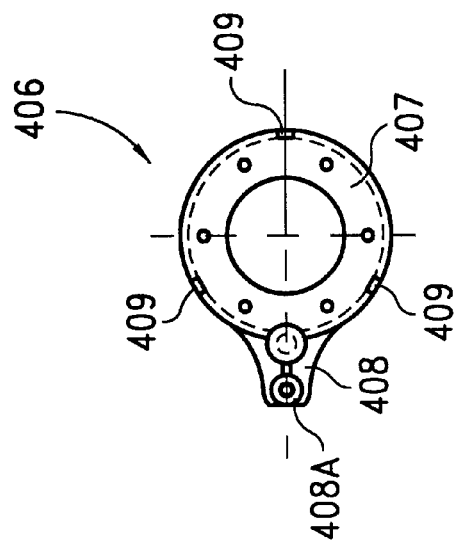
FIG. 7 displays a top view of the cap of the non-step lens assembly according to the present invention.

FIG. 7 shows a top view of the cap 406 of the present invention. The cap 406 has an opening in center, an annular portion 407 and a second haft 408. The hole 408A on the second haft 408 is connected with the hole 418B of the gear assembly 418 by a fixer. The annular portion 407 has some pins 409, which are at the same number with the first extrusive portions 429A of enclosure 426.

Figure 8B:
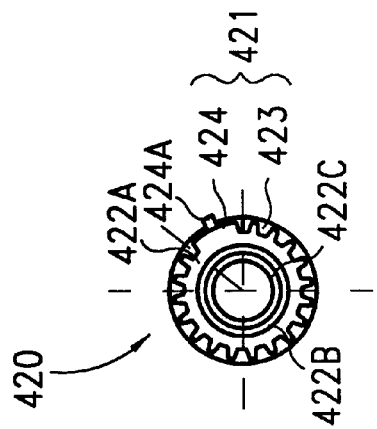
FIG. 8B displays a bottom view of the rotation ring of the non-step lens assembly according to the present invention.
Figure 8A:
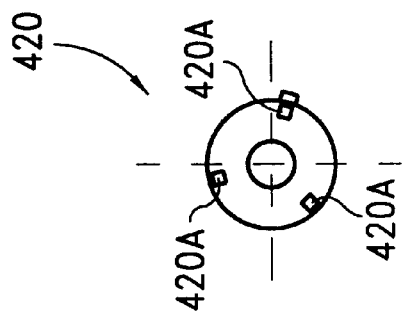
FIG. 8A displays a top view of the rotation ring of the non-step lens assembly according to the present invention.

FIG. 8A displays a top view of the annular rotating means 420. The three extrusive portions 420A are placed in 120° with each other. As shown in FIG. 8B, the other surface of the annular rotating means 420 has a second outer rim 421, second inner rim 422A, third inner rim 422B, and forth inner rim 422C. The forth inner rim 422C is used to accept the annular leaf spring 414. The spring 410 is placed on the second outer rim 421. The second outer rim 421 includes the first portion 423 and second portion 424. The first portion 423 matches the gear assembly 418. The second portion 424 has a third extrusive portion 424A to limit the annular rotating means revolving in the range of the first gap 429B. The annular rotating means 420 has a plurality of threads in its center for allowing the lens 402 to move vertically in the forth inner rim 422C. The haft 427 is connected with the second gap 429C, and the first haft 427 has a column 427A in order to connect the gear assembly 418. The threads of annular rotating means 420 allows the lens 402 screwed in or out.

Figure 9:
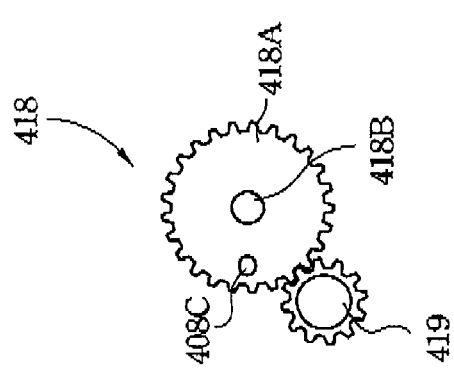
FIG. 9 displays a top view of the gear assembly of the non-step lens assembly according to the present invention.

Referring to FIG. 9, the gear assembly 418 is shown. Gear assembly 418 has an opening 418B connected with the column 427A of first haft 427 of enclosure 426. Referring to FIG. 8 simultaneously, gear assembly 418 is driven by a gear 419 mounted on the service motor so as to drive the second rim 421 of the annular rotating means 420. Therefore, the annular rotating means 420 would be driven by the gear assembly 418 to make the lens assembly move vertically along the direction, which is perpendicular to the plane of first hole 431, in order to adjust the focus of the lens 402.

Figure 10B:
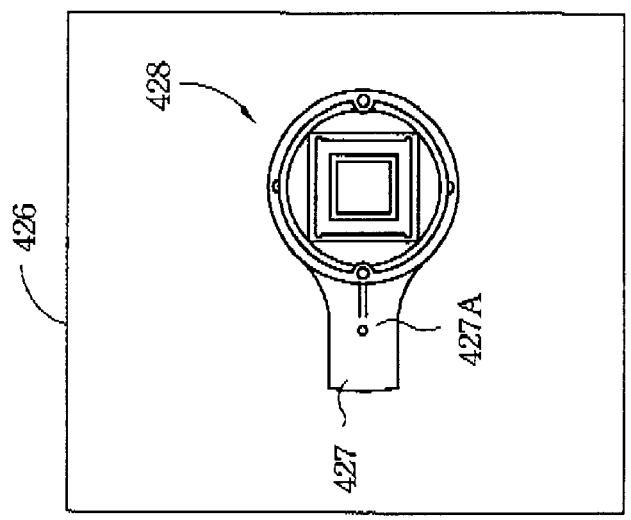
FIG. 10B displays a bottom view of the enclosure of the non-step lens assembly according to the present invention.
Figure 10A:
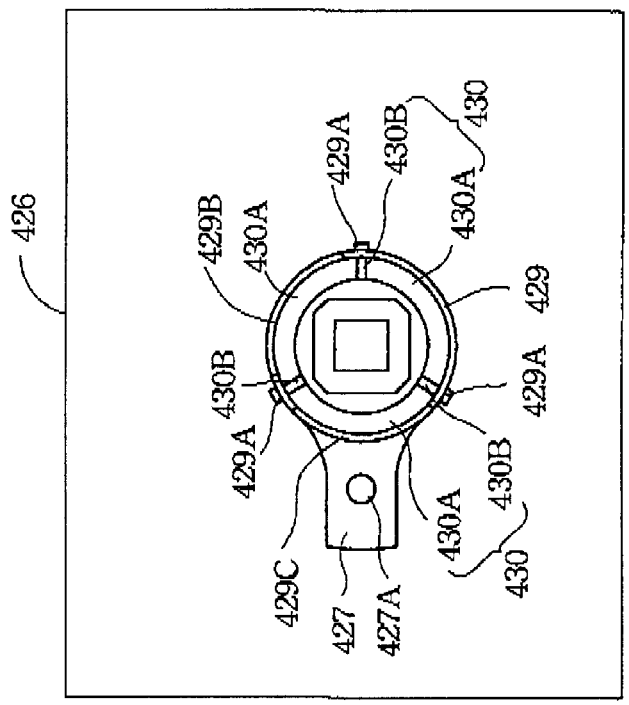
FIG. 10A displays a top view of the enclosure of the non-step lens assembly according to the present invention.

FIG. 10A is a top view of the enclosure 426. The enclosure 426 includes a first haft 427 and housing 428. Housing 428 has a first hole in its upper side and a second hole in its lower side. The first hole is used for supporting the annular rotating means 420, and the second hole is used for receiving the image capture apparatus 438. Furthermore, the housing 428 includes a first outer rim 429 enclosing the first hole and a first inner rim 430 in the bottom of the first hole. The first outer rim 429 has several first extrusive portions 429A for mounting the cap 406. According to the present invention, there are three extrusive portions 429A in it. The first outer rim 429 has a first gap 429B and second gap 429C. The first gap 429B allows the third extrusive portion 424A of the annular rotating means 420 to circle therein. The second gap 429C allows the annular rotating means 420 to connect with the gear assembly 418.

Still referring to FIG. 10A, the first inner rim 430 is consisted of several slope sets. According to a preferred embodiment, three slope sets are enough to achieve the non-step focusing function of digital camera. It is noticeable that each slope set has a main slope 430A and sub-slope 430B, in which the length of the sub-slopes 430B is much shorter than that of the main slopes 430A. The main slopes 430A are connected by the sub-slope 430B and in the same gradient, length, and height in their top points and bottom points. The distance from the bottom to the top of the slope is about 0.1~0.6 mm. Typically, the range of 0.1~0.4 mm is good enough to deal normal situations of taking pictures. Merely in some special cases such as macro shooting for close object, the range, 0.1~0.4 mm, wouldn't be enough to take the pictures. The sub-slope 430B is used to connect two adjacent main slopes 430A. However, the sub-slope could be also a vertical plane as long as the main slopes 430A keep continuously. For instance, in FIG. 10A, the main slope 430A of the first slope set and the main slope 430A of the second slope set are connected by the sub-slope 430B, which could be also a vertical plane. When the annular rotating means 420 is driven by the gear assembly 418, the locations of the three second extrusive portions 420A varies on each main slope 430A of the first inner rim 430. Sine the three slopes 430A are in the same gradient, the annular rotating means 420 would steadily move in a direction perpendicular to the slope sets. The sharper gradient of the slope is, the larger adjustment range is. Therefore, the lens 402 would move along the direction perpendicular to the plane of first hole, so as to adjust the focus of the lens 402.

Figure 10E:
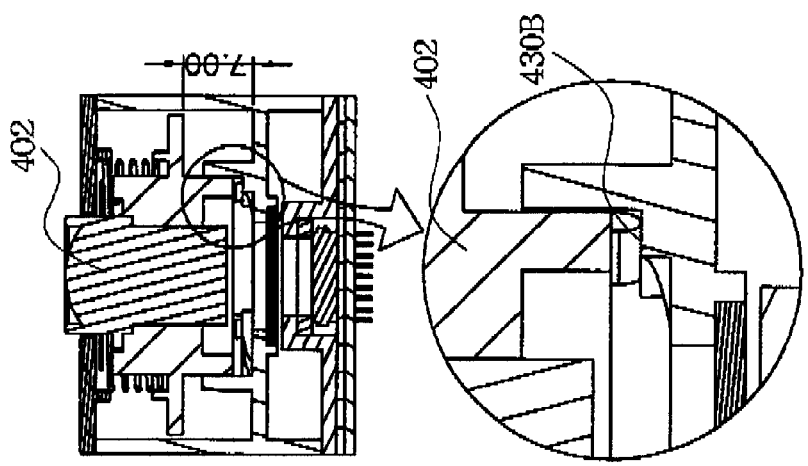
FIGS. 10C, 10D and 10E show the relationship between the lens the main slopes and the sub-slope when the lens are driven out.
Figure 10D:
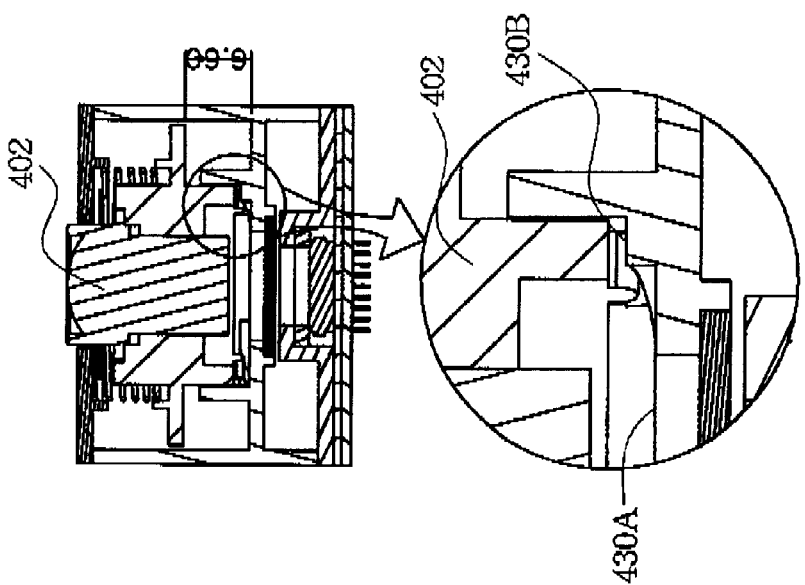
Figure 10C:
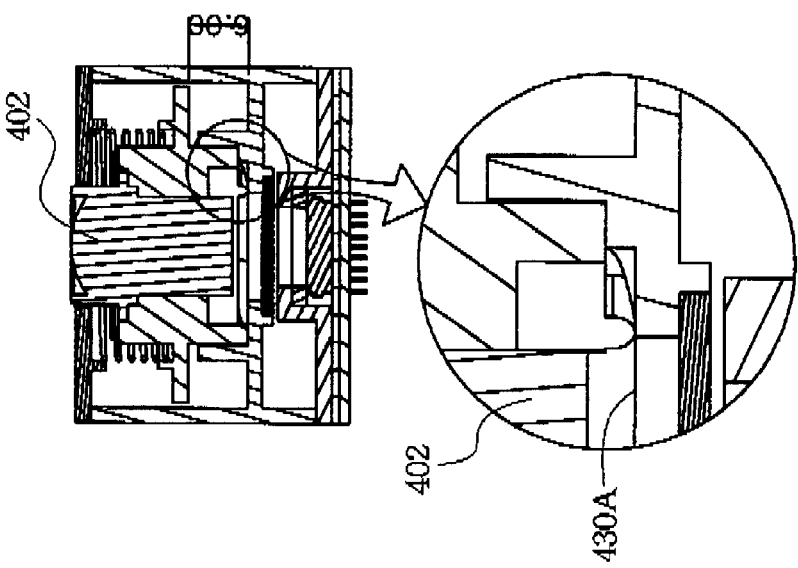

FIG. 10C to FIG. 10E show the relationship among the lens, the main slopes and the sub-slope when the lens are driven out. In FIG. 10C, the lens 402 is located on the main slope 430A. In FIG. 10D, the lens 402 is located on the slope between the main slope 430A and the sub-slope 430B. In FIG. 10E, the lens 402 is located on the sub-slope 430B. In other words, the lens can make a non-step focusing between the main slope 430A and the sub slope 430B. It is noticeable that the third extrusive portions of first gap 429B are not the necessary design. The annular rotating means 420 could still rotate in 360° on the slope sets of the enclosure as well as maintain the three extrusive portions 420A of the annular rotating means 420 on the main slopes 430A.

Typically, the gear 419 of service motor (not shown in figure) drives the gear assembly 418, thereby moving the annular rotating means 420 on the surface of main slopes 430A. When the angle of the service motor (not shown in figure) correspondent to the length of the slope 430A is getting less, it means that the focus could be adjusted more accurately. However, it also means the time of automatically focusing would be also getting longer.

Figure 13:
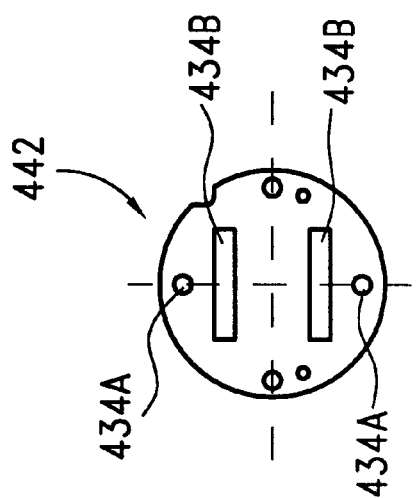
FIG. 13 displays a top view of the insulation plate of the non-step lens assembly according to the present invention.
Figure 12:
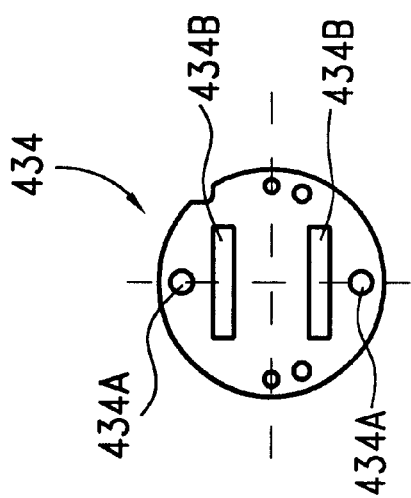
FIG. 12 displays a top view of the aluminum plate of the non-step lens assembly according to the present invention.
Figure 11:
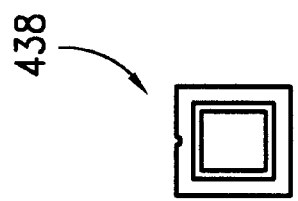
FIG. 11 displays a top view of the image capture apparatus of the non-step lens assembly according to the present invention.

FIG. 10B displays a bottom view of the enclosure 426. The enclosure 426 receives the image capture apparatus 438 shown in FIG. 11, for transforming the light passed via the lens 402 into electric signals. FIG. 12 and FIG. 13 portrait an aluminum plate 434 and insulation plate 442. Both they are mounted via the same holes 434A, for connecting to the enclosure by screws. Furthermore, two rectangular openings are applied to expose the pins of the image capture apparatus 438 out of the aluminum plate 434 and insulation plate 442.

The present lens assembly 302 of digital camera having a non-step focusing function is available to take scenes in different image depths. Therefore, the traditional problem of unavailable to take scenes in different image depths, the rigid unique-focus of traditional digital cameras, is resolved. In addition, the present lens assembly 302 utilizes the annular rotating means 420 to adjust its focus. This kind of adjustment would not introduce a force perpendicular to the lens 402, so the lens assembly will not offset in the perpendicular orientation.

As is understood by a person skilled in the art, the forgoing description of the preferred embodiment of the present invention is illustrative of the present invention rather than a limitation thereon. It is intended to cover various modifications and similar arrangements included within the spirit and scope of the appended claims. The scope of the claims should be accorded with the broadest interpretation so as to encompass all such modifications on the similar structure. While the preferred embodiment of the invention has been illustrated and described, it will be appreciated that various changes can be made therein without departing from the spirit and scope of the invention.

What is claimed is:

1. A lens assembly of digital camera, which comprises:
   an enclosure having a housing connected with a haft, the housing having an upper hole and a lower hole, wherein the upper hole has a rim consisted of a plurality of slope sets, each of which has a sub-slope and a main slope, the main slopes of the slope sets having a same gradient and being in a same height at highest points or lowest points of the main slopes;
   an image capture apparatus connected to the bottom hole of a column portion;
   an annular rotating means having a plurality of extrusive portions, the extrusive portions contacted with the slope sets of the rim of the upper hole, wherein the upper surface of the annular rotating means has a first inner rim and a second inner rim, a connecting means comprising a leaf spring connected to the first inner rim and a spring mounted on the second inner rim;
   a gear assembly supported by the haft, for connecting and driving the annular rotating means;
   a connecting means;
   a cap for covering the enclosure; and
   a lens located onto the cap and connected with the annular rotating means by the connecting means, for allowing light to pass through and projecting the light onto the image capture apparatus.

2. The lens assembly of claim 1, wherein the plurality of slope sets comprise three slope sets.

3. The lens assembly of claim 1, wherein the annular rotating means has a hollow part, whose inner walls have threads matching outer threads of the lens.

4. The lens assembly of claim 1, wherein upper surface of the annular rotating means has a first inner rim and second inner rim, the connecting means comprising:
- a leaf spring connected to the first inner rim of the upper surface of the annular rotating means; and
- a spring mounted on the second inner surface of the upper surface of the annular rotating means, the spring and the leaf spring being used for ensuring the lens and the annular rotating means to fix together, while the annular rotating means moves on the main slopes.

5. The lens assembly of claim 1, wherein upper surface of the annular rotating means has an inner rim, and the connecting means comprising:
- a spring mounted on the inner rim of the upper surface of the annular rotating means, the spring being used for ensuring the lens assembly and the annular rotating means to fix together, while the annular rotating means moves on the main slopes.

6. The lens assembly of claim 1, wherein the plurality of extrusive portions of the annular rotating means are in a same number with the plurality of slope sets.

7. The lens assembly of claim 1, wherein a difference of height between the highest points and the lowest points of the main slopes is between 0.1 mm~0.6 mm.

8. The lens assembly of claim 1, wherein the image capture apparatus comprises CCD or CMOS Sensor.

9. A lens assembly of digital camera, which comprises:
- a lens for allowing light to pass through;
- a cap for supporting the lens;
- a connecting means;
- an annular rotating means connected with the lens via the connecting means, for allowing the lens moving along a direction, which is perpendicular to a plane defined by the cap, to adjust a focus of the lens, wherein the upper surface of the annular rotating means has a first inner rim and a second inner rim, a connecting means comprising a leaf spring connected to the first inner rim and a spring mounted on the second inner rim;
- a gear assembly connected with the cap and the lens, for driving the annular rotating means;
- an enclosure having an upper hole and a lower hole connected with the cap, the annular rotating means, and the gear assembly for fixing the cap and allowing the annular rotating means to revolve thereon, wherein the upper hole has a rim consisted of a plurality of slope sets, each of which has a sub-slope and a main slope, the main slopes of the slope sets having a same gradient and being in a same height at highest points or lowest points of the main slopes; and
- an image capture apparatus connected to the enclosure for transforming the light, which passes through the lens, into electric signals.

10. The lens assembly of claim 9, wherein the plurality of slope sets comprise three slope sets.

11. The lens assembly of claim 9, wherein the annular rotating means having a hollow part, whose inner walls have threads matching outer threads of the lens, an upper surface of the annular rotating means having a first inner rim and second inner rim, and the connecting means comprising:
- a leaf spring connected to the first inner rim of the upper surface of the annular rotating means; and
- a spring mounted on the second inner rim of the upper surface of the annular rotating means, the spring and the leaf spring being used for ensuring the lens and the annular rotating means to fix together, while the annular rotating means moves on the main slopes.

12. The lens assembly of claim 9, wherein the upper surface of the annular rotating means has an inner rim, and the connecting means comprises:
- a spring mounted on the inner rim of the upper surface of the annular rotating means, the spring being used for ensuring the lens assembly and the annular rotating means to fix together, while the annular rotating means moves on the main slopes.

13. The lens assembly of claim 9, wherein the enclosure further comprises a haft for supporting the gear assembly.

14. The lens assembly of claim 9, wherein a difference of height between the top levels and the bottom levels of the main slopes is about 0.1 mm~0.6 mm.

15. The lens assembly of claim 9, wherein the image capture apparatus comprises CCD or CMOS Sensor.

* * * * *